United States Patent
Uematsu et al.

(10) Patent No.: US 6,966,171 B2
(45) Date of Patent: Nov. 22, 2005

(54) COMBINED CYCLE GAS TURBINE SYSTEM

(75) Inventors: Kazuo Uematsu, Takasago (JP);
Yoshinori Hyakutake, Takasago (JP);
Hideaki Sugishita, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 281 days.

(21) Appl. No.: 10/657,175

(22) Filed: Sep. 9, 2003

(65) Prior Publication Data

US 2004/0045274 A1 Mar. 11, 2004

Related U.S. Application Data

(62) Division of application No. 09/963,509, filed on Sep. 27, 2001, now Pat. No. 6,679,047.

(30) Foreign Application Priority Data

Nov. 13, 2000 (JP) ........................................ 2000-345041

(51) Int. Cl.$^7$ ............................................. F02C 6/18
(52) U.S. Cl. ..................................... 60/39.182; 60/806
(58) Field of Search ........................... 60/39.182, 784, 60/806

(56) References Cited

U.S. PATENT DOCUMENTS

| | | | |
|---|---|---|---|
| RE36,497 E | | 1/2000 | Tomlinson |
| RE36,524 E | | 1/2000 | Tomlinson |
| 6,089,012 A | | 7/2000 | Sugishita et al. |
| 6,116,017 A | * | 9/2000 | Mori et al. ............... 60/39.182 |
| 6,205,762 B1 | | 3/2001 | Uematsu et al. |
| 6,301,874 B1 | * | 10/2001 | Wakazono et al. ........ 60/39.182 |
| 6,389,797 B1 | | 5/2002 | Sugishita et al. |
| 6,438,939 B1 | | 8/2002 | Uematsu et al. |

FOREIGN PATENT DOCUMENTS

| | | |
|---|---|---|
| EP | 0911504 | 4/1999 |
| EP | 0939201 | 9/1999 |
| JP | 2699808 | 9/1997 |

OTHER PUBLICATIONS

Patent Abstracts of Japan, vol. 1999, No. 09, Jul. 20, 1999 & JP 11 093687 A (Mitsubishi Heavy Ind Ltd), Apr. 6, 1999.
Patent Abstracts of Japan, vol. 1999, No. 12, Oct. 29, 1999 & JP 11 200889 A (Mitsubishi Heavy Ind Ltd) Jul. 27, 1999.
Patent Abstracts of Japan, vol. 1999, No. 03, Mar. 31, 1999 & JP 10 339109 A (Mitsubishi Heavy Ind Ltd), Dec. 22, 1998.

* cited by examiner

Primary Examiner—Louis J. Casaregola
(74) Attorney, Agent, or Firm—Wenderoth, Lind & Ponack, L.L.P.

(57) ABSTRACT

A combined cycle gas turbine system is improved to enhance a gas turbine efficiency and a combined efficiency by effecting steam-cooling of a combustor transition piece and a turbine blade. The combined cycle system has a gas turbine (8) having a generator (1), a compressor (2), a combustor (3), a blade cooling air cooler (4) and a turbine (6), a steam turbine (29) having a high pressure turbine (21), an intermediate pressure turbine (22) and a low pressure turbine (23), and a waste heat recovery boiler (9). Saturated water of a high pressure pump (27) is partially led into a demineralizer (118) and a water sprayer (116) for cooling steam to be supplied into a moving blade (52). The steam, after being used for cooling, is recovered into a reheater (20). Outlet steam of the high pressure turbine (21) is led into a stationary blade (53) for cooling thereof and the steam is then recovered into an inlet of the intermediate pressure turbine (22). Also, steam of an intermediate pressure superheater (16) is led into a combustor transition piece (54) for cooling thereof and the steam is recovered into the inlet of the intermediate pressure turbine (22). Thus, moving blade cooling steam is reduced and the combined efficiency is enhanced.

9 Claims, 10 Drawing Sheets

COMBINED CYCLE GAS TURBINE SYSTEM

This is a Divisional Application of U.S. patent application Ser. No. 09/963,509, now U.S. Pat. No. 6,679,047 filed Sep. 27, 2001.

BACKGROUND OF THE INVENTION

1. Field of the Invention

The present invention relates generally to a combined cycle gas turbine system and, more particularly, to a combined cycle gas turbine system in which the temperature and flow rate of cooling steam are efficiently controlled and the heating of fuel and the cooling of gas turbine blade cooling air are carried out by steam generated at a waste heat recovery boiler.

2. Description of the Prior Art

FIG. 10 is a diagram of a steam cooled type combined cycle gas turbine system in the prior art.

In FIG. 10, the prior art steam cooled gas turbine system is constructed by a gas turbine 8, a waste heat recovery boiler 9 and a steam turbine 29. In the gas turbine 8, suction air is taken into a compressor 2 to be compressed to a predetermined pressure, and while the compressed air is partially used for cooling a gas turbine blade, the greater part thereof is led into a combustor 3 to be mixed with fuel 7 for generation of a high temperature gas. The high temperature gas enters a turbine 6 to expand for work, and the turbine output, after deduction of the compressor output, is converted into electric power at a generator 1. On the other hand, outlet steam of a high pressure turbine 21 flowing through piping 101 is partially taken to be supplied into the turbine 6 for cooling the gas turbine blade via the cooling steam supply piping 101. This steam is heated by cooling a steam cooled blade 51 and is recovered into an inlet of an intermediate pressure turbine 22 via cooling steam recovery piping 102. Thus, for cooling the gas turbine blade, the air bled from the compressor 2 and a portion of the outlet steam of the high pressure turbine 21 are used.

While outlet air of the compressor 2 is partially used for blade cooling in the turbine 6, this air, being of a high temperature, is cooled to a predetermined temperature at a blade cooling air cooler 4a using a cooling fan 5 and is then used for the turbine blade cooling. Thus, the air so led from the compressor 2 is first cooled at the blade cooling air cooler 4a using the cooling fan 5 to be then supplied into the turbine 6.

In the waste heat recovery boiler 9, outlet steam of a low pressure turbine 23 is converted into water from steam at a condenser 25. Then, the water is pressurized at a feed water pump 26 and heated at a feed water heater 10 to become saturated water. This saturated water is separated into three systems of water. The first one becomes saturated steam at a low pressure evaporator 11, becomes superheated steam at a low pressure superheater 15 and is then supplied to an inlet of the low pressure turbine 23. The second one is pressurized to a predetermined pressure at an intermediate pressure pump 28, becomes saturated water at an intermediate pressure economizer 12, becomes saturated steam at an intermediate pressure evaporator 14, becomes superheated steam at an intermediate pressure superheater 16 and is then supplied to an inlet of a reheater 20. And the third one is pressurized to a predetermined pressure at a high pressure pump 27, becomes saturated water at a first high pressure economizer 13 and a second high pressure economizer 17, becomes saturated steam at a high pressure evaporator 18, becomes superheated steam at a high pressure superheater 19 and is then led into the high pressure turbine 21. The mentioned superheated steam enters the high pressure turbine 21, the intermediate pressure turbine 22 and the low pressure turbine 23, respectively, to expand for generating an output, and this output is converted into electric power at a generator 24.

With respect to the abovementioned cooling by steam, it is impossible to use the steam in a quantity in excess of that of the steam obtainable at the outlet of the high pressure turbine 21. Hence, in order to secure a spare quantity of the available steam, it is preferable to reduce the flow rate of the cooling steam to the extent possible. Also, if the cooling steam is made less in quantity, it becomes possible to control the temperature of the steam, after being used for cooling, with less variation in the quantity of the cooling steam. Especially, if the temperature of the cooling steam heated by cooling is maintained to a predetermined level, it will not only enhance the reliability and life of the cooled blade, rotor, pipings, etc. of the gas turbine, but it will also ensure an operation that does not damage the enhanced combined efficiency. In order to reduce the quantity of the cooling steam, it is necessary to reduce the temperature of the cooling steam.

Thus, while the temperature of the cooling steam is necessary to be maintained lower for enhancing the reliability of the cooled blade or the like, in the system shown in FIG. 10, the cooling steam supply temperature is decided by the outlet conditions of the high pressure turbine 21, and it is difficult to further reduce the cooling steam temperature in this system.

Also, the air bled from the compressor for cooling the gas turbine blade is once cooled at the blade cooling air cooler 4a using the cooling fan 5 to be supplied into the turbine 6, as mentioned above, and the heat obtained by such cooling is discharged outside without use. This causes a reduction in the thermal efficiency (gas turbine efficiency and combined efficiency) of the gas turbine and of a combined cycle system using this gas turbine. Moreover, the fuel 7 is supplied into the combustor 3 without being heated (preheated).

SUMMARY OF THE INVENTION

In view of the mentioned problems in the prior art, therefore, it is an object of the present invention to provide a steam cooled type combined cycle gas turbine system in which the system is made such that the cooling of a turbine blade is done by steam partially taken from an outlet of a high pressure turbine, and the temperature of this steam is adjusted by cooling water taken from a waste heat recovery boiler or by water taken from a condenser. A cooling steam supply system is made such that a moving blade, a stationary blade and a combustor transition piece are supplied with steam via their respective separate systems so that the steam supplied to the stationary blade and the combustor transition piece may be of a temperature higher than that supplied to the moving blade to thereby obtain a higher effect of cooling by steam in the respective steam systems. Preheating of fuel is done to thereby enhance the combined efficiency.

In order to achieve the abovementioned object, the present invention provides the following inventions (1) to (8).

(1) A combined cycle gas turbine system comprises a steam turbine having a high pressure turbine, an intermediate pressure turbine and a low pressure turbine. A condenser condenses exhaust steam of the low pressure turbine of the steam turbine. A gland steam condenser is connected to the condenser. A gas turbine has a compressor for compressing air, a combustor for combusting fuel with the air coming from the compressor and a turbine for expanding high temperature combustion gas coming from the combustor for driving a generator. A cooling steam system cools the combustor and a blade of the turbine and a waste heat recovery boiler has components of a feed water heater, an intermediate pressure superheater, a reheater, etc., and is fed with exhaust gas of the gas turbine so that condensed water coming from the condenser via the gland steam condenser may be heated and vaporized via the components of the waste heat recovery boiler for supplying steam to the high pressure, intermediate pressure and low pressure turbines, respectively. The cooling steam system is constructed to comprise a moving blade cooling system having a water spray rate control valve for leading high pressure water from the feed water heater, a demineralizer connected to the water spray rate control valve and a water sprayer connected to the demineralizer for spraying the high pressure water into a passage for leading cooling steam from an outlet of the high pressure turbine to be supplied into a moving blade of the gas turbine. A stationary blade cooling system leads a portion of the steam from the outlet of the high pressure turbine into a stationary blade of the gas turbine. A combustor cooling system is fed with steam from the intermediate pressure superheater for cooling a transition piece of the combustor, steam from the moving blade cooling system is recovered into the reheater, and steam from the stationary blade cooling system and the combustor cooling system is recovered into an inlet of the intermediate pressure turbine.

(2) A combined cycle gas turbine system as mentioned in the invention (1) above has a sprayer provided so that water diverged at an outlet of the demineralizer may be sprayed into the combustor cooling system.

(3) A combined cycle gas turbine system comprises a steam turbine having a high pressure turbine, an intermediate pressure turbine and a low pressure turbine. A condenser condenses exhaust steam of the low pressure turbine of the steam turbine. A gland steam condenser is connected to the condenser. A gas turbine has a compressor for compressing air, a combustor for combusting fuel with the air coming from the compressor and a turbine for expanding a high temperature combustion gas coming from the combustor for driving a generator. A cooling steam system cools the combustor and a blade of the turbine. A waste heat recovery boiler has components of a feed water heater, an intermediate pressure superheater, a reheater, etc. and is fed with exhaust gas of the gas turbine so that condensed water coming from the condenser via the gland steam condenser may be heated and vaporized via the components of the waste heat recovery boiler for supplying steam to the high pressure, intermediate pressure and low pressure turbines, respectively. The cooling steam system is constructed to comprise a moving blade cooling system having a demineralizer connected to a downstream side of the condenser and a water sprayer being connected to the demineralizer for spraying water diverged from the condensed water into a passage for leading cooling steam from an outlet of the high pressure turbine to be supplied into a moving blade of the gas turbine. A stationary blade cooling system leads a portion of the steam from the outlet of the high pressure turbine into a stationary blade of the gas turbine. A combustor cooling system is fed with steam from the intermediate pressure superheater for cooling a transition piece of the combustor. Steam from the moving blade cooling system is recovered into the reheater and steam from the stationary blade cooling system and the combustor cooling system is recovered into an inlet of the intermediate pressure turbine.

(4) A combined cycle gas turbine system as mentioned in the invention (3) above has water at an outlet of the demineralizer heated at an economizer provided in the waste heat recovery boiler so as to be supplied into the water sprayer.

(5) A combined cycle gas turbine system as mentioned in the invention (4) above has a sprayer provided so that water diverged at an outlet of the economizer may be sprayed into the combustor cooling system.

(6) A combined cycle gas turbine system as mentioned in the invention (5) above has a sprayer provided so that water diverged at the outlet of the economizer may be sprayed into the stationary blade cooling system.

(7) A combined cycle gas turbine system as mentioned in any one of the inventions (3) to (6) above has a drain separator provided downstream of each water spraying in the moving blade cooling system, the stationary blade cooling system and the combustor cooling system.

(8) A combined cycle gas turbine system as mentioned in the invention (6) above has a filter provided downstream of each of the drain separators provided in the moving blade cooling system, the stationary blade cooling system and the combustor cooling system.

In the invention (1), the cooling steam system is constructed to comprise the three systems of the moving blade cooling system, the stationary blade cooling system and the combustor cooling system. The stationary blade cooling system is supplied with a portion of the steam from the outlet of the high pressure turbine and the combustor cooling system with the steam from the intermediate pressure superheater, of which the temperature is comparatively high to that of the moving blade cooling steam, to be used for the respective cooling. Also, the moving blade cooling system is constructed to comprise the water spray rate control valve, the demineralizer and the water sprayer so as to be sprayed with the water taken from the feed water heater via a high pressure pump. By such construction, the water spray rate is controlled by the water spray rate control valve and a quick control of the supply temperature of the moving blade cooling steam becomes possible. The demineralizer is one such as is usually used for removing dissolved minerals in the condenser of a supercritical pressure plant or a nuclear plant so impurities in the water can be removed by the demineralizer. Also, the gland steam condenser is provided so as to make use of condensed water of the gland steam whereby a more efficient system can be constructed. By all these constructions, there is obtained the feature that a quick reduction in the supply temperature and supply quantity of the moving blade cooling steam becomes possible. Also, the temperature of the steam, after being used for the cooling, can be controlled with less variation in the quantity of the cooling steam, and thereby a spare quantity of the available steam can be ensured and reliability and life elongation of the cooled blade, rotor and pipings can be realized.

In the invention (2), in addition to the construction of the invention (1), the combustor cooling system is sprayed with the water from the demineralizer by the water sprayer and thereby, in addition to the effect of the invention (1), the steam temperature in the combustor cooling system can be set lower and the cooling efficiency can be further enhanced.

In the invention (3), while the construction and effect of the stationary blade cooling system and the combustor cooling system are the same as those of the invention (1), the water spraying into the moving blade cooling system is done by the water sprayer using the water taken from the condenser via the demineralizer, and this water sprayed is taken from the system that is independent of the waste heat recovery boiler. Thus, the water to be sprayed is supplied from the upstream side of the waste heat recovery boiler, there are fewer impurities mixed in the cooling steam, that is, the purity of the cooling steam is enhanced, and the capability of preventing oxidation of the pipings or the like is enhanced. In addition to the above effect, as in the invention (1), such a demineralizer as is usually used for removing dissolved minerals in the condenser of a super-critical pressure plant or a nuclear plant is used, whereby impurities in the water can be removed. Also, the gland steam condenser is provided so as to make use of condensed water of the gland steam also and thereby a more efficient system can be constructed.

By such construction, there is obtained the feature that a quicker reduction in the supply temperature and supply quantity of the moving blade cooling steam becomes possible. Also, the temperature of the steam, after being used for the cooling, can be controlled with less variation in the quantity of the cooling steam and thereby a spare quantity of the available steam can be ensured and reliability and life elongation of the cooled blade, rotor and pipings can be realized.

In the invention (4), the water supply passage to the water sprayer in the invention (3) enters the waste heat recovery boiler before the water enters the water sprayer. The water is heated at the economizer in the waste heat recovery boiler and is sprayed into the moving blade cooling system. Hence, in addition to the effect of the invention (3), the temperature difference between the steam and the water to be sprayed is made smaller and influences of the thermal stress in the pipings or the like can be reduced.

In the invention (5), in addition to the construction of the invention (4), the water spraying system for spraying the water diverged at the outlet of the economizer into the combustor cooling system is provided. Hence, in addition to the effect of the invention (4), the temperature of the steam supplied into the combustor cooling system can be set lower and the cooling of the combustor can be done more efficiently.

In the invention (6), in addition to the construction of the invention (5), the water spraying system for spraying the water diverged at the outlet of the economizer into the stationary blade cooling system is also provided. Hence, in addition to the effect of the invention (5), the temperature of the steam supplied into the stationary blade cooling system can be set lower and the cooling of the stationary blade also can be done more efficiently.

In the invention (7), the drain separator is provided downstream of the water sprayer in each of the moving blade, stationary blade and combustor cooling systems. Thereby, the water content in the steam is removed and the cooling in the inventions (3) to (6) can be done more effectively.

In the invention (8), the filter is provided downstream of the drain separator in each of the moving blade, stationary blade and combustor cooling systems of the construction of the invention (7). Thereby, impurities in the water sprayed from the water sprayer are removed from the steam and hence, in addition to the effect of the invention (7), such shortcomings as clogging of the passages due to the impurities, like scales, in the cooling steam supplied into the respective cooling systems can be prevented.

DESCRIPTION OF THE PREFERRED EMBODIMENTS

Herebelow, embodiments according to the present invention will be described concretely with reference to figures.

Figure 1:
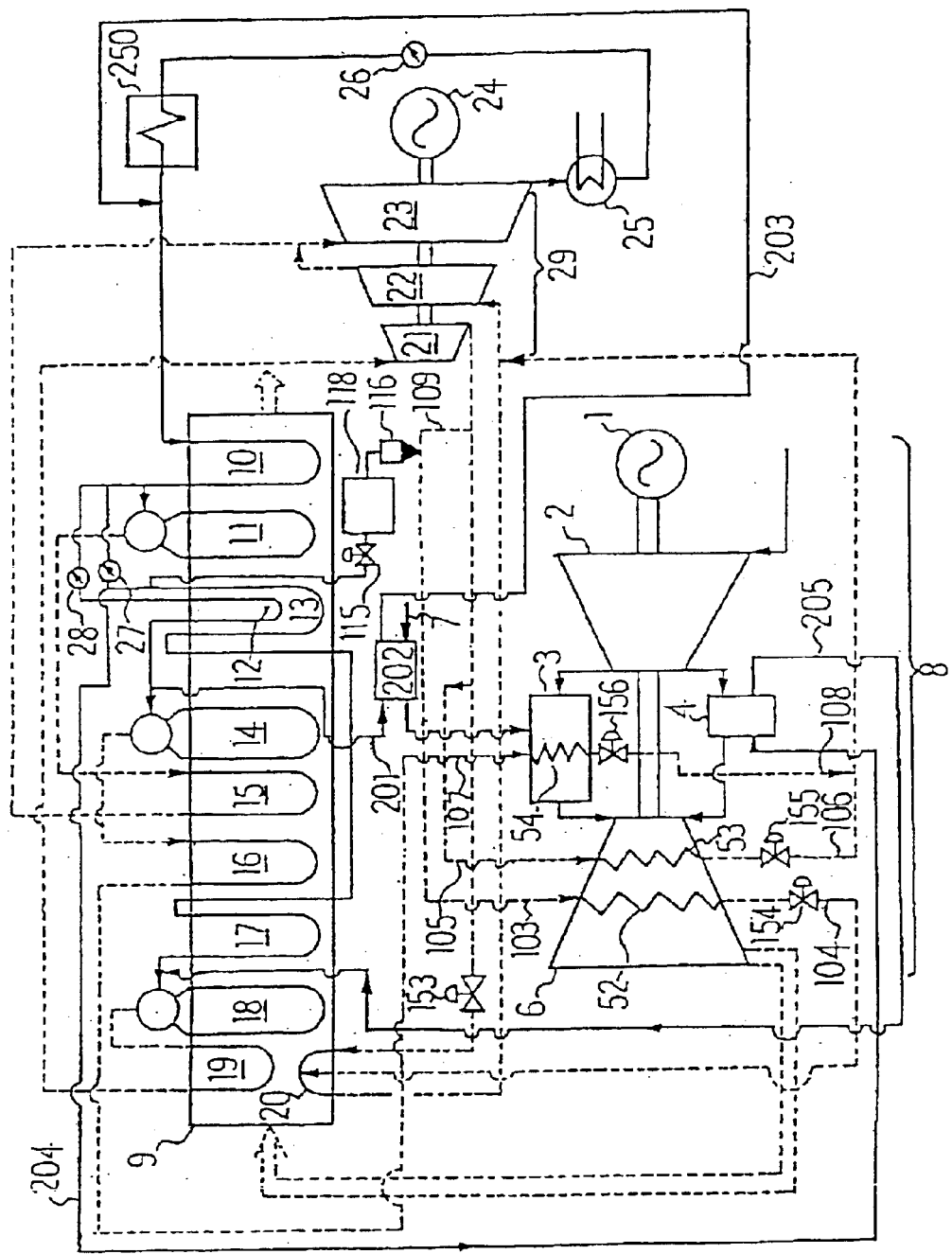
FIG. 1 is a diagram of a combined cycle gas turbine system of a first embodiment according to the present invention.

FIG. 1 is a diagram of a combined cycle gas turbine system of a first embodiment according to the present invention. In FIG. 1, the combined cycle gas turbine system of the first embodiment is constructed by a gas turbine 8, a waste heat recovery boiler 9 and a steam turbine 29. In the gas turbine 8, suction air is taken into a compressor 2 to be compressed to a predetermined pressure, and while the compressed air is partially used for cooling a gas turbine blade, the greater part thereof is led into a combustor 3 to be mixed with fuel for the generation of a high temperature gas. The high temperature gas enters a turbine 6 to expand for work and the turbine output, after deduction of the compressor output is converted into an electric power at a generator 1.

In the waste heat recovery boiler 9, outlet steam of a low pressure turbine 23 is converted into water from steam at a condenser 25. Then, the water is pressurized at a feed water pump 26 and is supplied into a gland steam condenser 250 to be added with water condensed from steam used for sealing of a gland portion and becomes low temperature water. This water is further led into a feed water heater 10 to be heated to become saturated water. This saturated water is separated into three systems of water. The first one becomes saturated steam at a low pressure evaporator 11, becomes superheated steam at a low pressure superheater 15, and is then supplied to an inlet of the low pressure turbine 23. The second one is pressurized to a predetermined pressure at an intermediate pressure pump 28, becomes saturated water at an intermediate pressure economizer 12, becomes saturated steam at an intermediate pressure evaporator 14 and becomes superheated steam at an intermediate pressure superheater 16 and is then supplied into a transition piece of the combustor 3 for cooling thereof, as will be described later. And the third one is pressurized to a predetermined pressure at a high pressure pump 27, becomes saturated water at a first high pressure economizer 13 and a second high pressure economizer 17, becomes saturated steam at a high pressure evaporator 18, becomes superheated steam at a high pressure superheater 19 and is then led into a high pressure turbine 21. The mentioned superheated steam enters the high pressure turbine 21, an intermediate pressure turbine 22 and the low pressure turbine 23, respectively, to expand for generating an output, and this output is converted into electric power at a generator 24.

Figure 10:
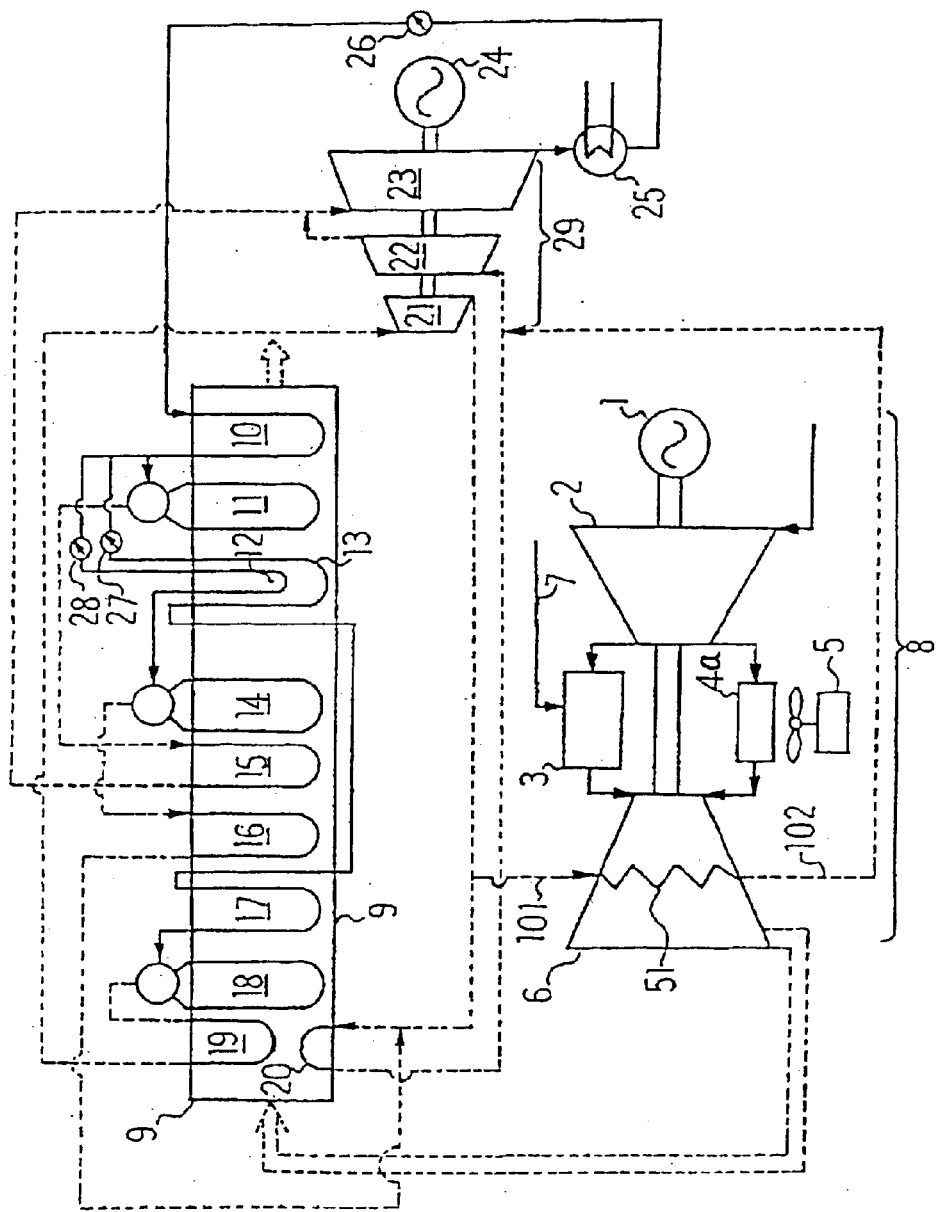
FIG. 10 is a diagram of a combined cycle gas turbine system in the prior art.

In the present embodiment of FIG. 1, the portion corresponding to the cooled blade 51 in the prior art shown in FIG. 10 is divided into a steam cooled moving blade 52, a steam cooled stationary blade 53 and a steam cooled combustor transition piece 54. As for the steam cooled moving blade 52, in which the temperature of the steam, after being used for cooling, is low, outlet steam of the high pressure turbine 21 is partially extracted for cooling the steam cooled moving blade via piping 109 and is sprayed with water at a water sprayer 116, as will be described later, to be supplied into the steam cooled moving blade 52 via a moving blade cooling steam supply piping 103. The steam heated by cooling the steam cooled moving blade 52 is recovered into a middle portion of the reheater 20 via a flow regulating valve 154 and moving blade cooling steam recovery piping 104.

Also, a fuel heater 202 is provided and the system is so made that saturated steam, partially extracted from an outlet of the intermediate pressure economizer 12, flows through the fuel heater 202 via piping 201 for heating fuel 7 and is then supplied to an inlet of the feed water heater 10 via piping 203. By this arrangement, the fuel 7 is heated and the flow rate of the fuel is reduced. Thus, the gas turbine efficiency and the combined efficiency are enhanced.

Also, outlet water of the high pressure pump 27 is partially taken via piping 204 to be supplied into a blade cooling air cooler 4. At the blade cooling air cooler 4, the water is heated by cooling air taken from the compressor 2, and the cooling air is cooled. The water is then recovered into an inlet of the high pressure evaporator 18 via piping 205. By this arrangement, the heat which has previously been discharged outside by a cooling fan is recovered into the waste heat recovery boiler 9, and the combined efficiency is enhanced.

Also, a flow regulating valve 115, a demineralizer 118 and a water sprayer 116 are added for partially extracting outlet water of the high pressure pump 27 and controlling to spray the water for cooling the blade cooling steam.

By this arrangement, the water spray rate is controlled by the flow regulating valve 115 and the supply temperature of the moving blade cooling steam becomes adjustable more quickly than in the prior art. Also, such a demineralizer 118 as is usually used for removing dissolved minerals in the condenser of a supercritical pressure plant or a nuclear plant is used and impurities in the water can be removed.

Thus, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured.

Also, the system is so made that cooling steam for cooling the steam cooled combustor transition piece 54 is taken from outlet steam of the intermediate pressure superheater 16 and is recovered into an inlet of the intermediate pressure turbine 22 via a flow regulating valve 156.

By this arrangement, the flow rate of the cooling steam extracted from the outlet of the high pressure turbine 21 via the piping 109 is reduced and thereby a spare quantity of the available steam can be ensured.

Also, as the temperature of the steam cooled stationary blade 53 may be to some extent higher than that of the moving blade 52, outlet steam of the high pressure turbine 21 is extracted via piping 105 without being cooled to be supplied as it is into the stationary blade 53 for cooling thereof and the steam heated thereby is recovered into an inlet of the intermediate pressure turbine 22 via piping 106.

By this arrangement, while the temperature of the stationary blade cooling steam becomes higher than that of the moving blade cooling steam, there is no reduction in the combined efficiency and a reduction in the supply quantity of the stationary blade and moving blade cooling steam becomes possible. Also, the temperature of the steam, after being used for cooling, can be controlled with less variation in the quantity of the cooling steam. Thus, a spare quantity of the available steam is ensured and reliability and life elongation of the cooled blade, rotor and pipings can be ensured.

Also, as flow regulating valves 153, 154, 155 and 156 are added and, by opening and closing these valves 153 to 156, the flow rate of the cooling steam of the moving blade, stationary blade and combustor transition piece becomes adjustable. Thereby, not only in the rating time, but also in the partial load time, the temperature of the respective recovery steam can be controlled and there is obtained effect ensuring the reliability and life elongation of the moving and stationary blades, combustor transition piece, rotor and pipings. As the respective flow regulating valves are opened, the flow rate of the steam supplied increases and the temperature of the respective recovery steam is reduced. Also, as the respective flow regulating valves are closed, the flow rate of the steam supplied is reduced and the temperature of the respective recovery steam is elevated.

Thus, according to the combined cycle gas turbine system of the first embodiment as described above, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and the reliability and life elongation of the cooled blade, rotor and pipings can be ensured.

Figure 2:
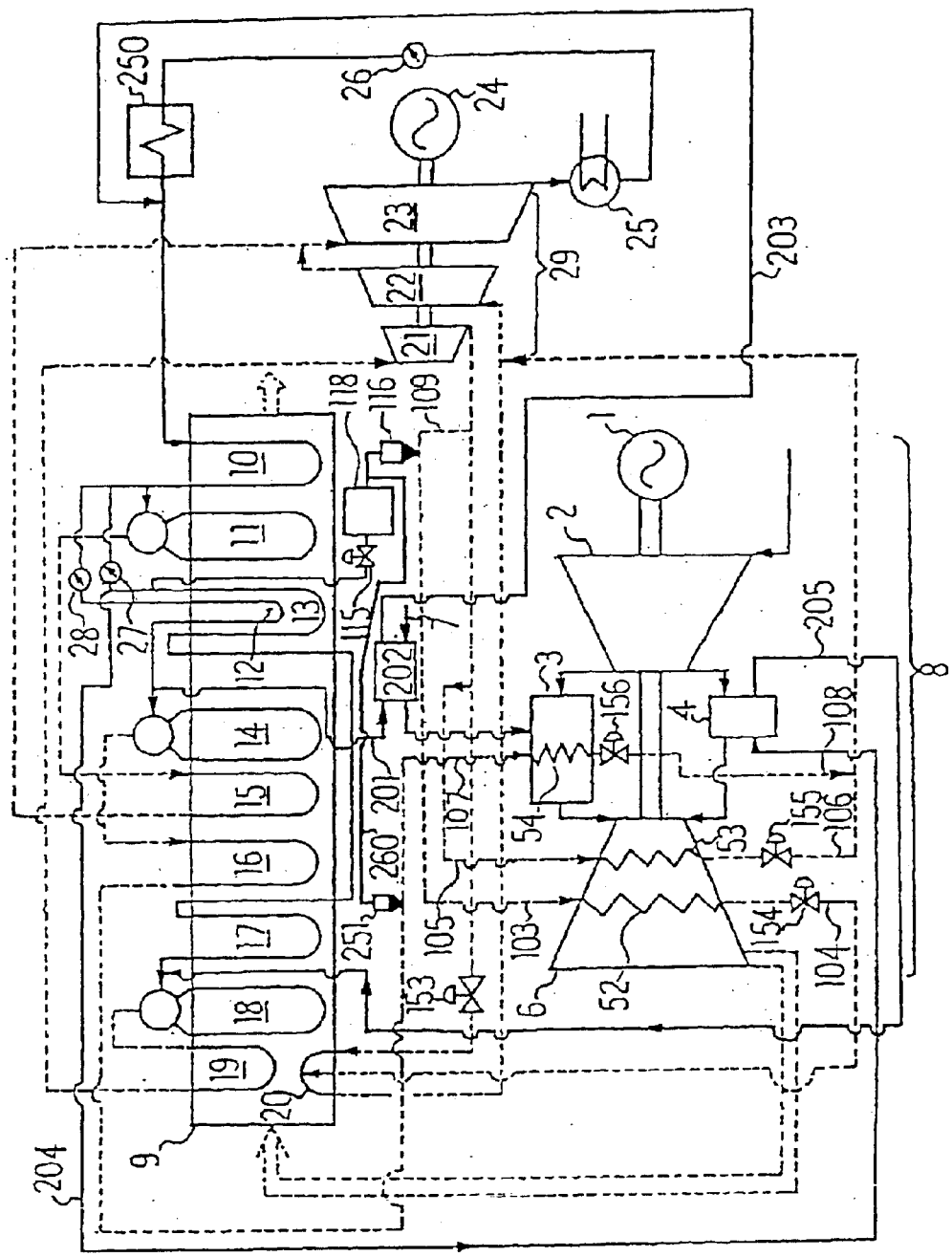
FIG. 2 is a diagram of a combined cycle gas turbine system of a second embodiment according to the present invention.

FIG. 2 is a diagram of a combined cycle gas turbine system of a second embodiment according to the present invention. In the present second embodiment, as compared with the construction of the first embodiment shown in FIG. 1, the system is made so that a water spray system for a combustor transition piece cooling system is added. As the construction and function of other portions are the same as those of the first embodiment shown in FIG. 1, description thereof is omitted and the featured portion will be described.

In FIG. 2, while water from the demineralizer 118 is supplied into the water sprayer 116 to be sprayed into piping 109 that leads outlet steam of the high pressure turbine 21, the water from the demineralizer 118 is diverged to be supplied into a water sprayer 251 via piping 260. It is sprayed into combustor transition piece cooling steam supply piping 107 so as to adjust the temperature of the cooling steam for cooling the combustor transition piece 54.

Thus, when the flow rate of the water taken from the high pressure pump 27 is controlled by the flow regulating valve 115, the spray rate of the water sprayers 116 and 251 can be adjusted at the same time and the temperature of the steam for cooling the steam cooled moving blade 52 and the steam cooled combustor transition piece 54 can be appropriately controlled.

In the present second embodiment, as in the first embodiment, a quicker reduction in the supply temperature and supply quantity of the moving blade cooling steam becomes possible. Also, the temperature of the steam, after being used for the cooling, can be controlled with less variation in the quantity of the cooling steam. Hence, a spare quantity of the available steam is ensured and reliability and life elongation of the cooled blade, rotor and pipings can be ensured. Moreover, by providing the water sprayer 251, the cooling of the steam cooled combustor transition piece 54 can be controlled appropriately, as described above.

Figure 3:
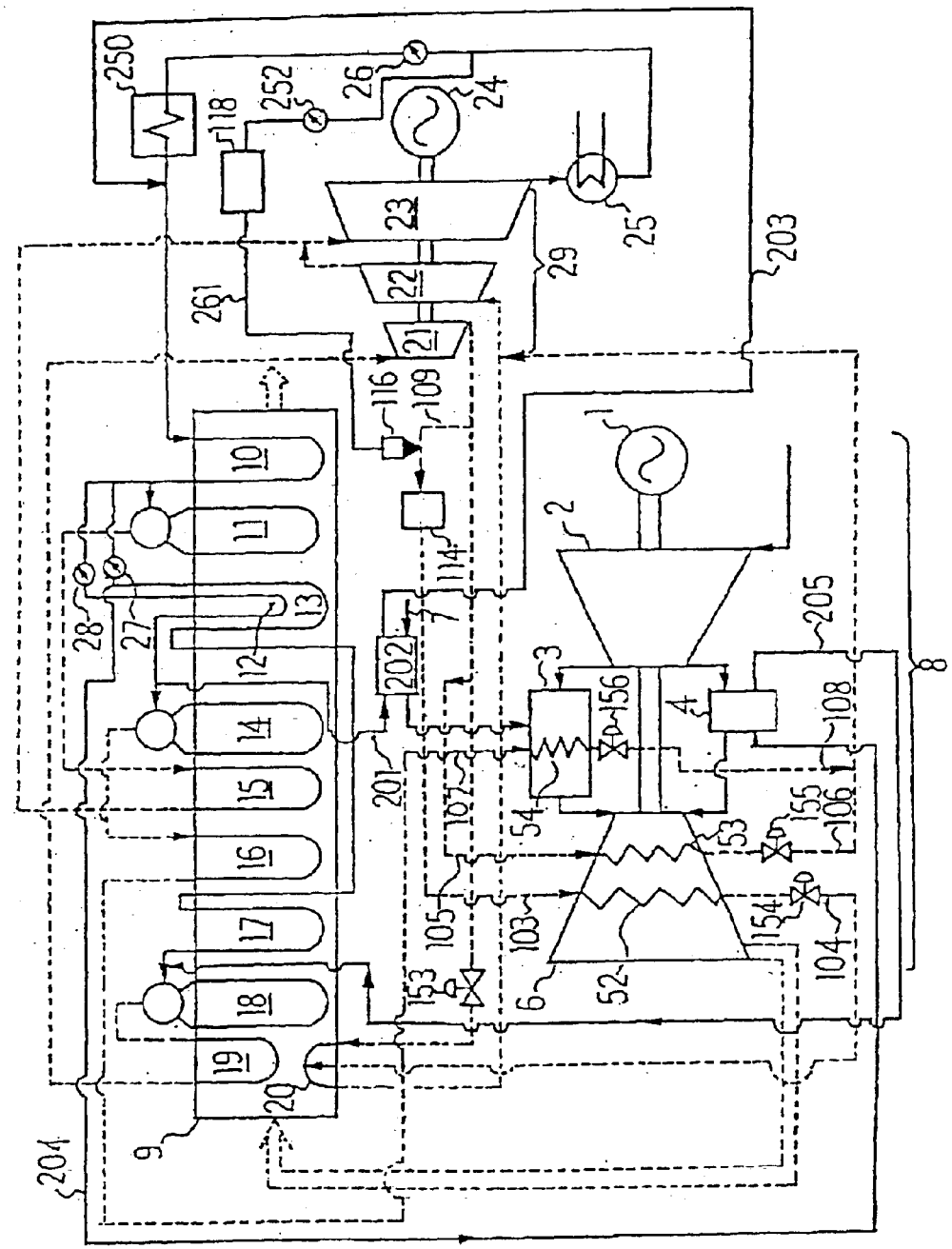
FIG. 3 is a diagram of a combined cycle gas turbine system of a third embodiment according to the present invention.

FIG. 3 is a diagram of a combined cycle gas turbine system of a third embodiment according to the present invention. In the present third embodiment, as compared with the first embodiment shown in FIG. 1, the system is so made that the water supply system for the water sprayer 116 is made independent of the waste heat recovery boiler 9, and a drain separator 114 is provided downstream of the water sprayer 116. It is to be noted that the drain separator 114 may not be necessarily provided. As the construction and function of other portions are the same as those of the first embodiment shown in FIG. 1, description thereof is omitted and the featured portion will be described.

While, in the construction of FIG. 1, the water taken from the high pressure pump 27 is supplied into the water sprayer 116 via the flow regulating valve 115 and the demineralizer 118, in the third embodiment shown in FIG. 3, water condensed at the condenser 25 is partially taken by a feed water pump 252 to be led into the demineralizer 118 and then into the water sprayer 116, provided at the same position as in FIG. 1, via piping 261. Thus, the water supply system for the water sprayer 116 is made independent of the waste heat recovery boiler 9 and the water therefor is supplied from the condenser 25 of the turbine.

In the present third embodiment also, as in the first embodiment, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured. Moreover, by taking the water from the condenser 25, impurities mixed in the water flowing in the pipings or the like can be reduced. Thereby, purity of the cooling steam is enhanced and oxidation of the pipings or the like can be prevented.

Figure 4:
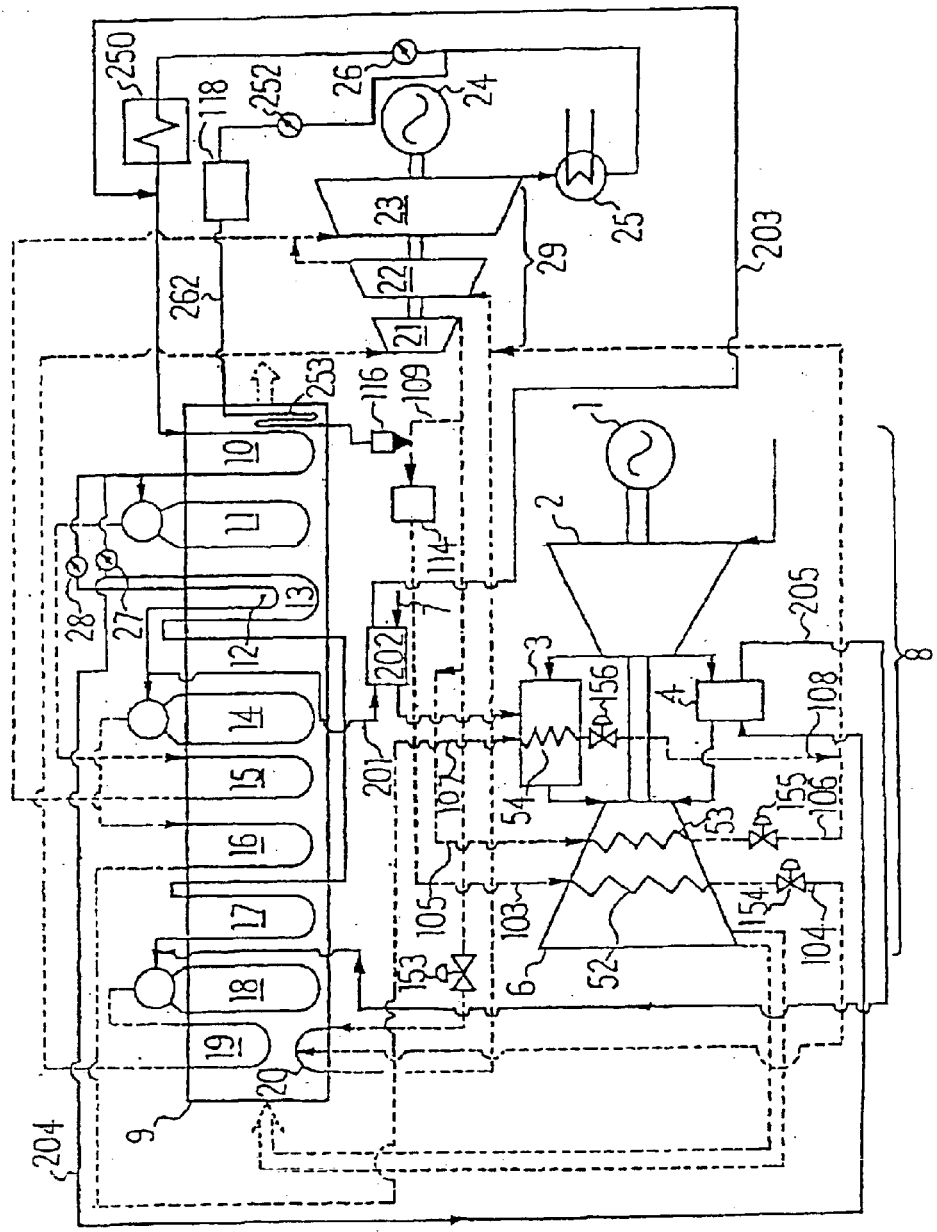
FIG. 4 is a diagram of a combined cycle gas turbine system of a fourth embodiment according to the present invention.

FIG. 4 is a diagram of a combined cycle gas turbine system of a fourth embodiment according to the present invention. In the present fourth embodiment, as compared with the third embodiment shown in FIG. 3, while the construction to make the water supply system for the water sprayer 116 independent of the waste heat recovery boiler 9 is the same, water to be supplied into the water sprayer 116 flows through an economizer 253 for adjustment of the temperature. As the construction and function of other portions are the same as those of the third embodiment shown in FIG. 3, description thereof is omitted and the featured portion will be described.

While, in the construction of FIG. 1, the water taken from the high pressure pump 27 is supplied into the water sprayer 116 via the flow regulating valve 115 and the demineralizer 118, in the fourth embodiment shown in FIG. 4, as in the example of FIG. 3, water condensed at the condenser 25 is partially taken by the feed water pump 252 to be led into the demineralizer 118. In the present fourth embodiment, the water supplied into the demineralizer 118 is further led into the economizer 253, which is provided in the waste heat recovery boiler 9, via piping 262 for adjustment of the temperature of the water, and is then supplied into the water sprayer 116, provided at the same position as in FIG. 1. Thus, the water for the water sprayer 116 is supplied from the condenser 25 of the turbine, not from, and independently of, the waste heat recovery boiler 9.

In the present fourth embodiment also, as in the third embodiment, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured. Moreover, by taking the water from the condenser 25, impurities mixed in the water flowing in the pipings or the like can be reduced. Thereby, the purity of the cooling steam is enhanced and oxidation of the pipings or the like can be prevented. Also, as the water for the water sprayer 116 is supplied independently of the waste heat recovery boiler 9, but the temperature of the water is adjusted, or elevated, at the economizer 253 provided in the waste heat recovery boiler 9, the temperature difference between the steam and the cold water at the time of mixing by the water spraying is made smaller and thermal stress caused at the time of the mixing can be suppressed.

Figure 5:
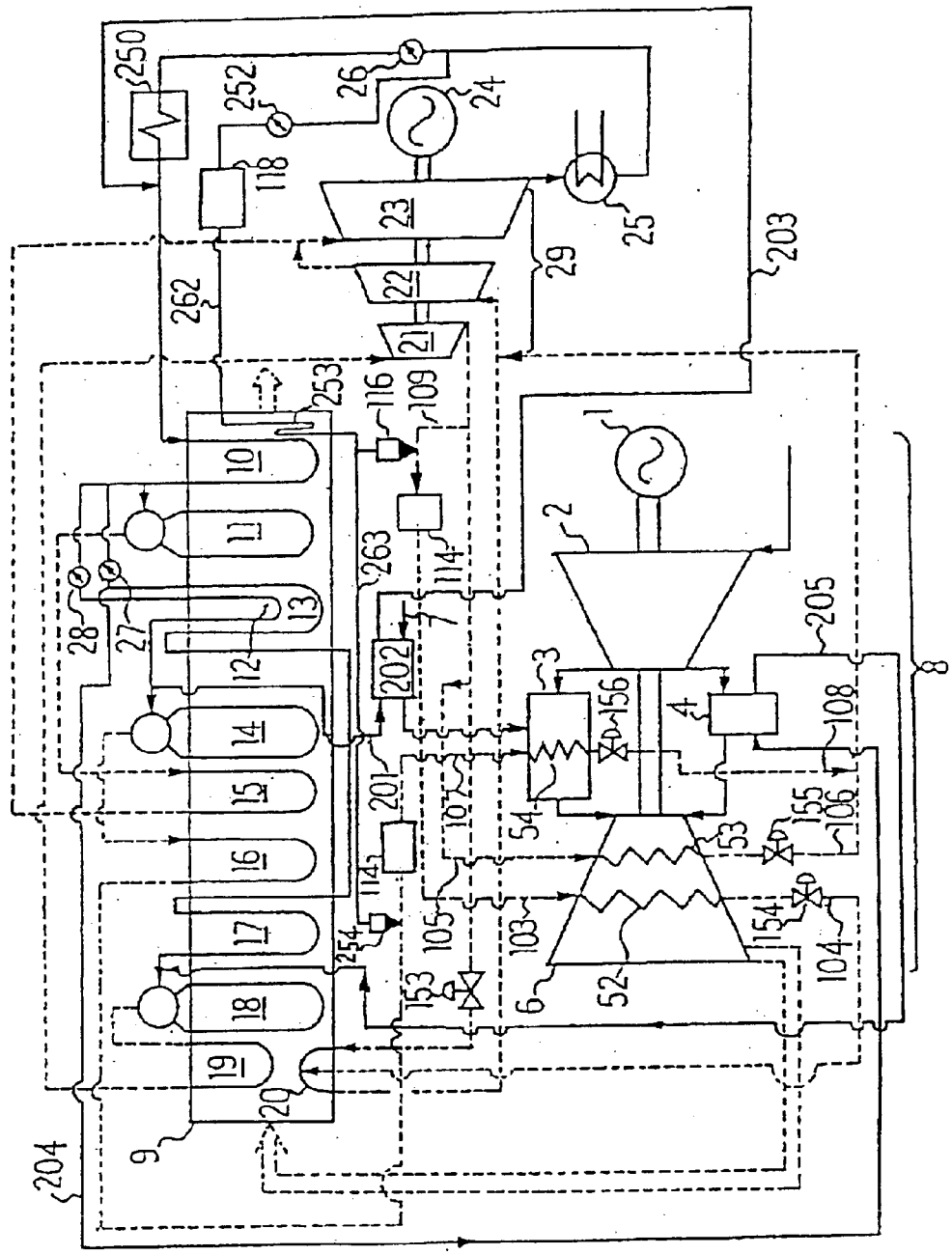
FIG. 5 is a diagram of a combined cycle gas turbine system of a fifth embodiment according to the present invention.

FIG. 5 is a diagram of a combined cycle gas turbine system of a fifth embodiment according to the present invention. In the present fifth embodiment, as compared with the fourth embodiment shown in FIG. 4, a water spray system and a drain separator, both in the combustor transition piece cooling system, are added. As the construction and function of other portions are the same as those of the fourth embodiment shown in FIG. 4, description thereof is omitted and the featured portion will be described.

In FIG. 5, water condensed at the condenser 25 is partially taken by the feed water pump 252 to be led into the demineralizer 118 and is further led into the economizer 253, provided in the waste heat recovery boiler 9, via the piping 262 for adjustment (elevation) of the temperature to be then supplied into the water sprayer 116 provided at the same position as in FIG. 1. Thus, the water for the water sprayer 116 is taken from the condenser 25 of the turbine, not from, and independently of, the waste heat recovery boiler 9. This construction as so far described is the same as that of the fourth embodiment of FIG. 4.

Furthermore, in the fifth embodiment, the water at an inlet of the water sprayer 116 is diverged to flow into a water sprayer 254 via piping 263. At the water sprayer 254, the water is sprayed into the combustor transition piece cooling steam supply piping 107. A drain separator 114 is provided downstream of the water sprayer 254 to thereby completely remove the water content of the steam and then the steam is supplied into the steam cooled combustor transition piece 54 for cooling thereof.

In the present fifth embodiment also, as in the fourth embodiment, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured. Moreover, by taking the water from the condenser 25, impurities in the water can be reduced to thereby prevent oxidation of the pipings or the like. Also, as the water for the water sprayer 116 is supplied independently of the waste heat recovery boiler 9, but the temperature of the water is adjusted, or elevated, at the economizer 253 provided in the waste heat recovery boiler 9, the temperature difference between the steam and the cold water at the time of mixing by the water spraying is made smaller and thermal stress caused at the time of the mixing can be suppressed. Furthermore, the temperature of the cooling steam for the combustor transition piece is adjusted to be reduced by the water sprayer 254 and the water content of this steam is removed by the drain separator 114. Hence, the cooling effect of the combustor transition piece is further enhanced.

Figure 6:
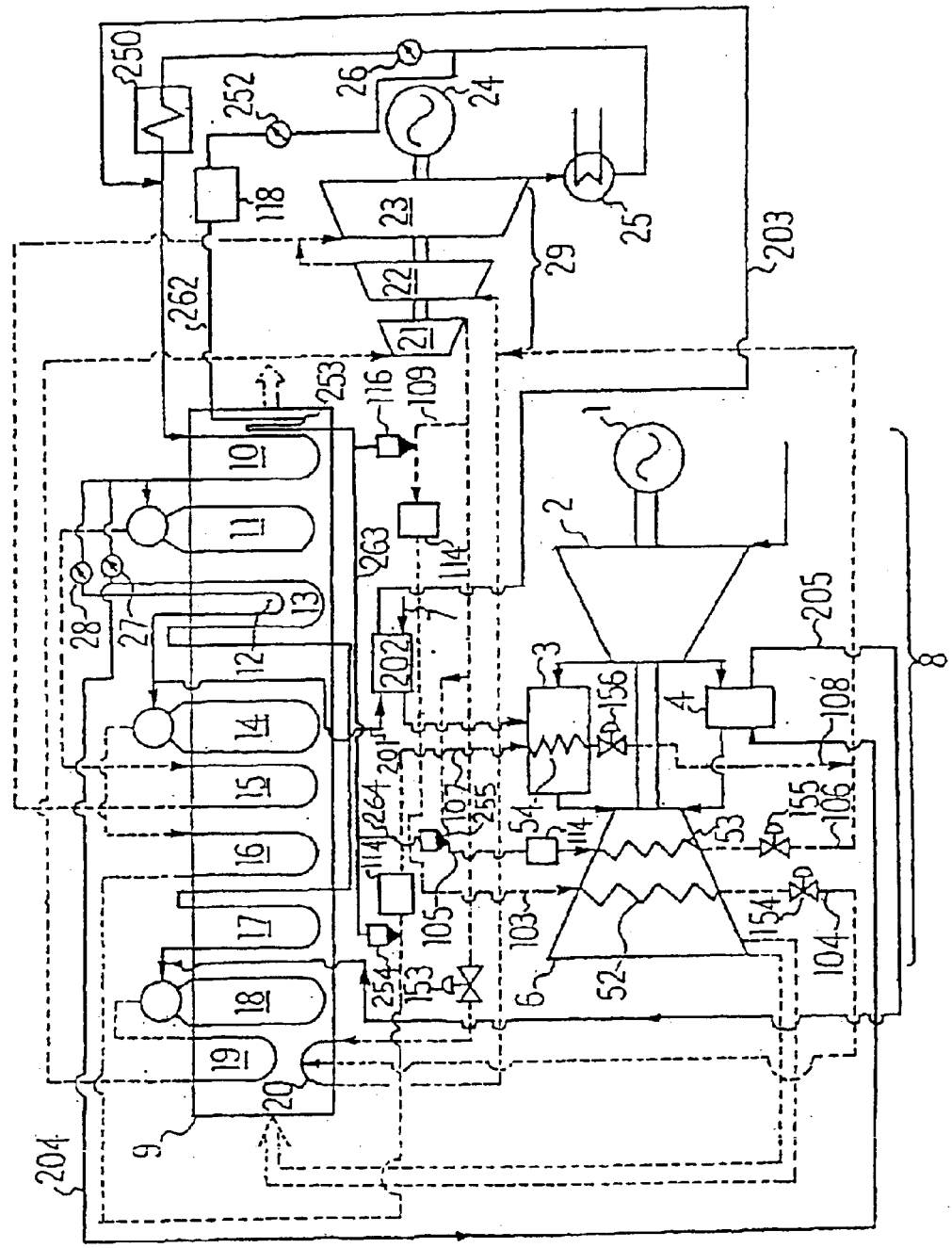
FIG. 6 is a diagram of a combined cycle gas turbine system of a sixth embodiment according to the present invention.

FIG. 6 is a diagram of a combined cycle gas turbine system of a sixth embodiment according to the present invention. In the present sixth embodiment, as compared with the fifth embodiment shown in FIG. 5, a water sprayer and a drain separator are added also to the steam cooled stationary blade cooling system. As the construction and function of other portions are the same as those of the fifth embodiment shown in FIG. 5, description thereof is omitted and the featured portion will be described.

In FIG. 6, water condensed at the condenser 25 is partially taken by the feed water pump 252 to be led into the demineralizer 118 and is further led into the economizer 253, provided in the waste heat recovery boiler 9, via the piping 262 for adjustment (elevation) of the temperature, then to be supplied into the water sprayer 116 provided at the same position as in FIG. 1. Thus, the water for the water sprayer 116 is taken from the condenser 25 of the turbine, not from, and independently of, the waste heat recovery boiler 9. Further, the water at an inlet of the water sprayer 116 is diverged to flow into the water sprayer 254 via the piping 263. At the water sprayer 254, the water is sprayed into the combustor transition piece cooling steam supply piping 107. The drain separator 114 is provided downstream of the water sprayer 254 to thereby completely remove water content of the steam and then the steam is supplied into the steam cooled combustor transition piece 54 for cooling thereof.

While the construction described above is the same as that of the fifth embodiment shown in FIG. 5, in the present sixth embodiment, the construction is so made that the water in the piping 263 is diverged to flow into a water sprayer 255 via piping 264 to be sprayed into the stationary blade cooling steam supply piping 105. Also, a drain separator 114 is provided downstream of the water sprayer 255 to thereby remove the water content of the steam and then the steam is supplied into the steam cooled stationary blade 53 for cooling thereof.

In the present sixth embodiment also, as in the fifth embodiment, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured. Moreover, by taking the water from the condenser 25, impurities in the water can be reduced to thereby prevent oxidation of the pipings or the like. Also, as the water for the water sprayer 116 is supplied independently of the waste heat recovery boiler 9, but the temperature of the water is adjusted, or elevated, at the economizer 253 provided in the waste heat recovery boiler 9, the temperature difference between the steam and the cold water at the time of mixing by the water spraying is made smaller and thermal stress caused at the time of the mixing can be suppressed.

Furthermore, the temperature of the cooling steam for the combustor transition piece is adjusted to be reduced by the water sprayer 254 and the water content of this steam is removed by the drain separator 114. Hence, the cooling effect of the combustor transition piece is further enhanced. In addition to this effect, as the water in the piping 264 is sprayed into the stationary blade cooling steam by the water sprayer 255 and the water content of the cooling steam is removed by the drain separator 114, the temperature of the cooling steam is reduced and the cooling effect of the steam cooled stationary blade can be further enhanced.

Figure 7:
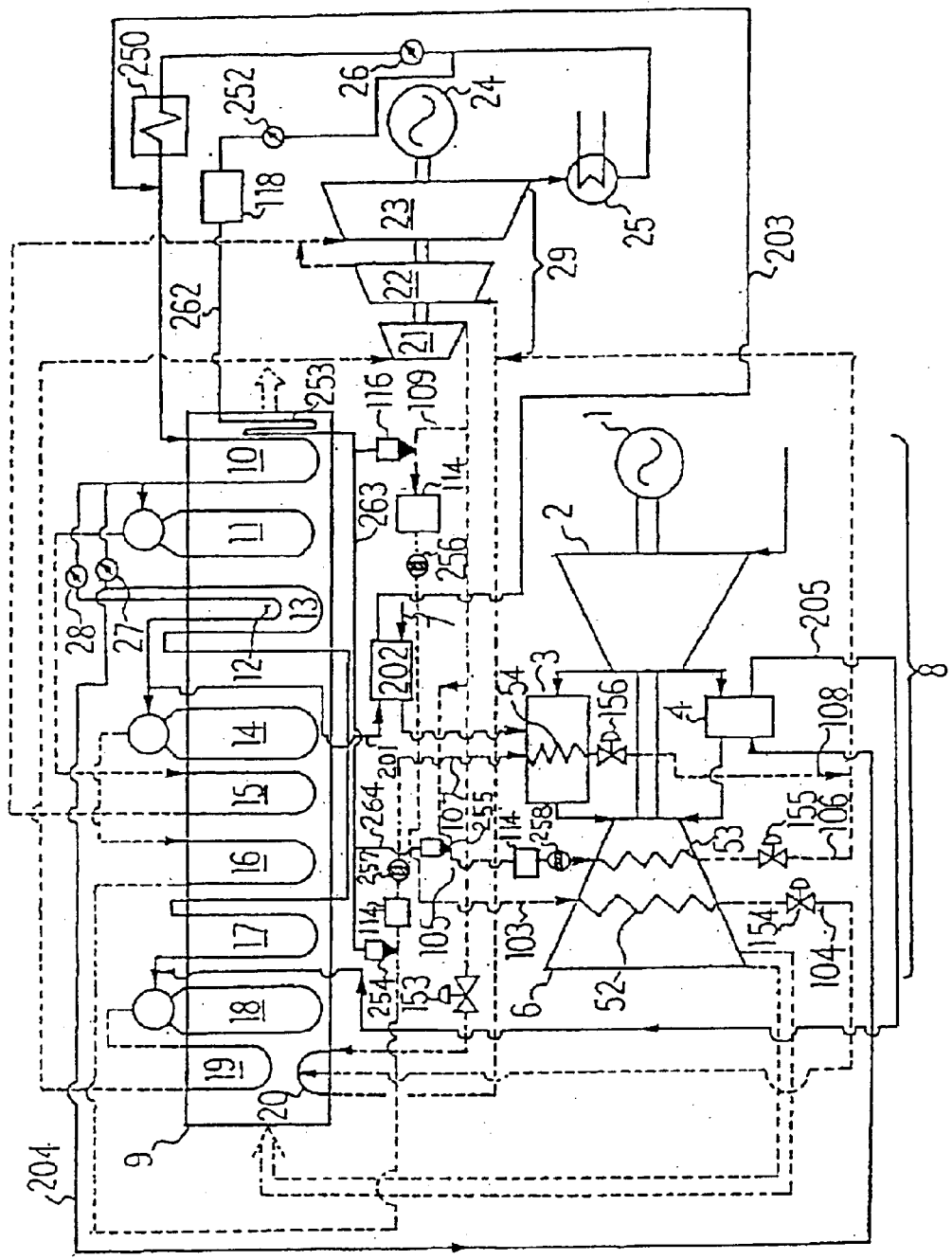
FIG. 7 is a diagram of a combined cycle gas turbine system of a seventh embodiment according to the present invention.

FIG. 7 is a diagram of a combined cycle gas turbine system of a seventh embodiment according to the present invention. In the present seventh embodiment, as compared with the sixth embodiment shown in FIG. 6, a filter is provided downstream of each of the three drain separators 114. As the construction and function of other portions are the same as those of the sixth embodiment shown in FIG. 6, description thereof is omitted and the featured portion will be described.

In FIG. 7, water condensed at the condenser 25 is partially taken by the feed water pump 252 to be led into the demineralizer 118 and is further led into the economizer 253, provided in the waste heat recovery boiler 9, via the piping 262 for adjustment (elevation) of the temperature to be then supplied into the water sprayer 116 provided at the same position as in FIG. 1. Thus, the water for the water sprayer 116 is taken from the condenser 25 of the turbine, not from, and independently of, the waste heat recovery boiler 9. The steam in the piping 109 is sprayed with the water by the water sprayer 116, the water content of this steam is removed at the drain separator 114, and then the steam is supplied into the steam cooled moving blade 52 for cooling thereof via a filter 256, as will be described below.

Further, the water at the inlet of the water sprayer 116 is diverged to flow into the water sprayer 254 via the piping 263. At the water sprayer 254, the water is sprayed into the combustor transition piece cooling steam supply piping 107. Water content in the steam sprayed with the water is removed at the drain separator 114 provided downstream of the water sprayer 254 and the steam is supplied into the steam cooled combustor transition piece for cooling thereof via a filter 257, as will be described below.

Also, the water in the piping 263 is diverged to flow into the water sprayer 255 via the piping 264 to be sprayed into the stationary blade cooling steam supply piping 105. Water content in the steam sprayed with the water is removed at the drain separator 114 provided downstream of the water sprayer 255 and then the steam is supplied into the stationary blade for cooling thereof via a filter 258, as will be described below.

The construction and function described above are the same as those of the sixth embodiment shown in FIG. 6 except for the portions of the filters 256 to 258. In the present seventh embodiment, drain of the steam sprayed with the water is removed at the drain separators 114 provided at the three places, and impurities of such sizes as cause clogging of the steam pipings are prevented by the filters 256 to 258 from coming into the portions to be cooled. The filters 256 to 258 are of a mesh of about 50 to 1000$\mu$.

In the present seventh embodiment also, as in the sixth embodiment, a quicker reduction in the supply temperature and supply quantity of the moving blade cooling steam becomes possible. Also, the temperature of the steam, after being used for cooling, can be controlled with less variation in the quantity of the cooling steam. Hence, a spare quantity of the available steam is ensured and reliability and life elongation of the cooled blade, rotor and pipings can be ensured. Moreover, by taking the water from the condenser 25, impurities in the water can be reduced to thereby prevent oxidation of the pipings or the like. Also, as the water for the water sprayer 116 is supplied independently of the waste heat recovery boiler 9, but the temperature of the water is adjusted, or elevated, at the economizer 253 provided in the waste heat recovery boiler 9, the temperature difference between the steam and the cold water at the time of mixing by the water spraying is made smaller and thermal stress caused at the time of the mixing can be suppressed.

Furthermore, the temperature of the cooling steam for the combustor transition piece is adjusted to be reduced by the water sprayer 254 and the water content of this steam is removed by the drain separator 114. Hence, the cooling effect of the combustor transition piece is further enhanced. In addition to this effect, as the water in the piping 264 is sprayed into the stationary blade cooling steam by the water sprayer 255 and the water content of the cooling steam is removed by the drain separator 114, the temperature of the cooling steam is reduced and the cooling effect of the steam cooled stationary blade can be further enhanced.

Also, by providing the filters 256 to 258 downstream of the drain separators 114, impurities in the steam are removed and hence the problem of causing the clogging of the pipings is solved and the reliability of the cooling is remarkably enhanced.

Figure 8:
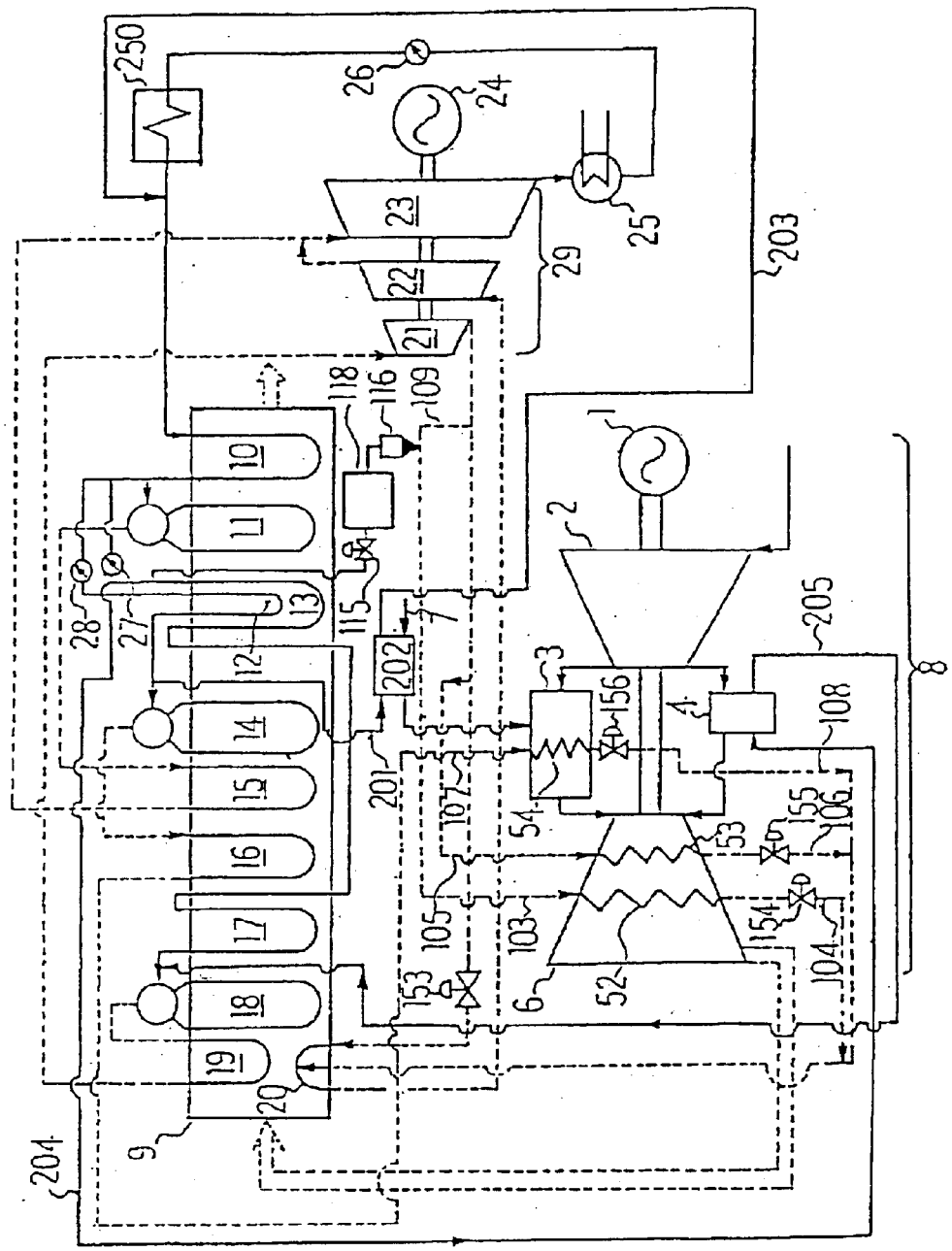
FIG. 8 is a diagram of a combined cycle gas turbine system of an eighth embodiment according to the present invention.

FIG. 8 is a diagram of a combined cycle gas turbine system of an eighth embodiment according to the present invention. In the present eighth embodiment, as compared with the first embodiment shown in FIG. 1, the steam, after being used for cooling of the steam cooled stationary blade 53 and the combustor transition piece 54, is recovered not into the intermediate pressure turbine 22, but into the reheater 20. That is, the construction is made such that the three steams, after being used for the cooling of the steam cooled moving blade 52, the stationary blade 53 and the combustor transition piece 54, are joined together to be recovered into the reheater 20. The construction of other portions is the same as that of the first embodiment shown in FIG. 1 and description thereof is omitted.

As the steam recovered into the reheater 20 is finally led into the intermediate pressure turbine 22, the mentioned three steams are in any case mixed before they enter the intermediate pressure turbine 22. If suppression of the pressure loss in the reheater 20 is considered, the mentioned steams are not necessarily recovered into the reheater 20, but in the present eighth embodiment, all of the three steams are first led into the reheater 20 to be mixed there in view of the relation of the arrangement of the moving blade, the stationary blade and the combustor, as well as of the reheater 20 and the intermediate pressure turbine 22. Thus, the temperature of the steam is made uniform in the pipings from the reheater 20 to the intermediate pressure turbine 22 and there the high temperature piping portions can be reduced and troubles caused by the non-uniform temperature can be prevented.

Figure 9:
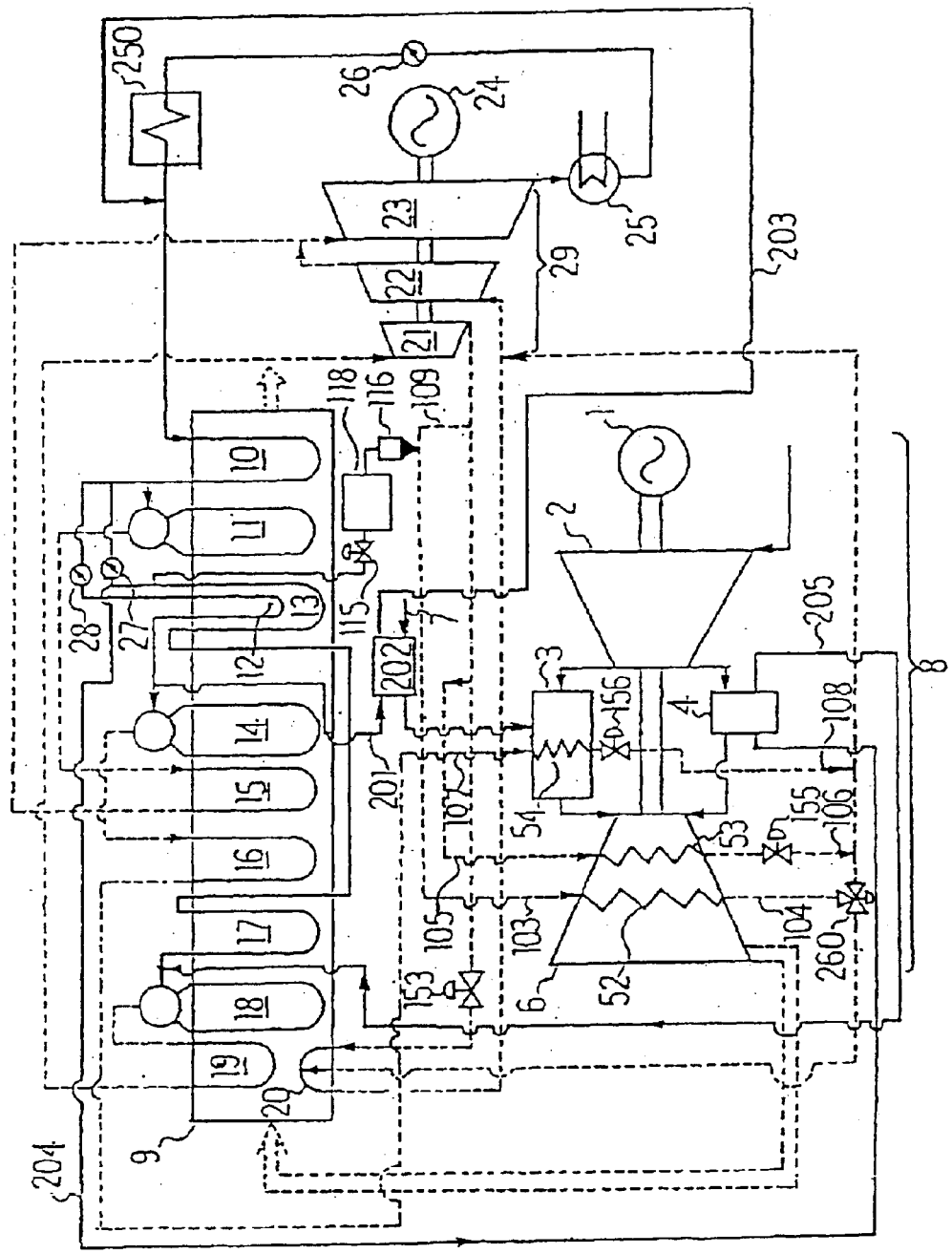
FIG. 9 is a diagram of a combined cycle gas turbine system of a ninth embodiment according to the present invention.

FIG. 9 is a diagram of a combined cycle gas turbine system of a ninth embodiment according to the present invention. While, in the first embodiment shown in FIG. 1, the steam, after being used for cooling of the steam cooled moving blade 52, is recovered into the reheater 20 via the flow regulating valve 154, in the present ninth embodiment, the construction is made such that the steam, after being used for the cooling of the moving blade, may be recovered either into the intermediate pressure turbine 22 or into the reheater 20 via a three way valve 260. The construction of other portions is the same as that of the first embodiment shown in FIG. 1. In the present ninth embodiment also, by controlling the three way valve 260, the three steams used for the cooling of the steam cooled moving blade 52, the stationary blade 53 and the combustor transition piece 54, respectively, are mixed appropriately and can be supplied into the intermediate pressure turbine 22, and the same effect as in the abovementioned eighth embodiment can be obtained.

It is to be noted as a matter of course that the constructions shown in FIGS. 8 and 9 to mix the three steams used for the cooling of the moving blade, the stationary blade and the combustor transition piece to be supplied into the reheater 20 can be also applied to the systems of the second to the seventh embodiments shown in FIGS. 2 to 7.

While the preferred forms of the present invention have been described, it is to be understood that the invention is not limited to the particular constructions and arrangements herein illustrated and described but embraces such modified forms thereof as come within the scope of the appended claims.

What is claimed is:

1. A combined cycle gas turbine system comprising; a steam turbine having a high pressure turbine, an intermediate pressure turbine and a low pressure turbine; a condenser for condensing exhaust steam of the low pressure turbine of the steam turbine; a gland steam condenser being connected to the condenser; a gas turbine having a compressor for compressing air, a combustor for combusting fuel with the air coming from the compressor and a turbine for expanding a high temperature combustion gas coming from the combustor for driving a generator; a cooling steam system for cooling the combustor and a blade of the turbine; and a waste heat recovery boiler having components of a feed water heater, an intermediate pressure superheater, and a reheater, and being fed with exhaust gas of the gas turbine so that condensed water coming from the condenser via the gland steam condenser may be heated and vaporized via the components of the waste heat recovery boiler for supplying steam to the high pressure, intermediate pressure and low pressure turbines, respectively, wherein the cooling steam system is constructed to comprise; a moving blade cooling system having a demineralizer being connected to a downstream side of the condenser and a water sprayer being connected to the demineralizer for spraying water diverged from the condensed water into a passage for leading cooling steam from an outlet of the high pressure turbine to be supplied into a moving blade of the gas turbine; a stationary blade cooling system for leading a portion of the steam from the outlet of the high pressure turbine into a stationary blade of the gas turbine; and a combustor cooling system being fed with steam from the intermediate pressure superheater for cooling a transition piece of the combustor, and steam from the moving blade cooling system is recovered into the reheater and steam from the stationary blade cooling system and the combustor cooling system is recovered into an inlet of the intermediate pressure turbine.

2. A combined cycle gas turbine system as claimed in claim 1, wherein water at an outlet of the demineralizer is heated at an economizer provided in the waste heat recovery boiler to be supplied into the water sprayer.

3. A combined cycle gas turbine system as claimed in claim 2, wherein a sprayer is provided so that water diverged at an outlet of the economizer may be sprayed into the combustor cooling system.

4. A combined cycle gas turbine system as claimed in claim 3, wherein a sprayer is provided so that water diverged at the outlet of the economizer may be sprayed into the stationary blade cooling system.

5. A combined cycle gas turbine system as claimed in claim 1, wherein a drain separator is provided downstream of each water spraying in the moving blade cooling system, the stationary blade cooling system and the combustor cooling system.

6. A combined cycle gas turbine system as claimed in claim 4, wherein a filter is provided downstream of each of the drain separators provided in the moving blade cooling system, the stationary blade cooling system and the combustor cooling system.

7. A combined cycle gas turbine system as claimed in claim 2, wherein a drain separator is provided downstream of each water spraying in the moving blade cooling system, the stationary blade cooling system and the combustor cooling system.

8. A combined cycle gas turbine system as claimed in claim 3, wherein a drain separator is provided downstream of each water spraying in the moving blade cooling system, the stationary blade cooling system and the combustor cooling system.

9. A combined cycle gas turbine system as claimed in claim 4, wherein a drain separator is provided downstream of each water spraying in the moving blade cooling system, the stationary blade cooling system and the combustor cooling system.

* * * * *